United States Patent [19]

Tohma

[11] 3,911,208

[45] Oct. 7, 1975

[54] DROP-OUT COMPENSATING CIRCUIT

[75] Inventor: Takaaki Tohma, Yokohama, Japan

[73] Assignee: Sony Corporation, Tokyo, Japan

[22] Filed: May 31, 1974

[21] Appl. No.: 475,253

[30] Foreign Application Priority Data

June 7, 1973 Japan ................................ 48-64131
June 7, 1973 Japan ................................ 48-64132

[52] U.S. Cl. ............................ 178/6.6 DC; 360/38
[51] Int. Cl. ............................................ H04n 5/42
[58] Field of Search .................. 360/38; 178/6.6 DC

[56] References Cited

UNITED STATES PATENTS

| | | | |
|---|---|---|---|
| 2,845,484 | 7/1958 | Johnson | 178/6.6 DC |
| 3,328,521 | 6/1967 | Moskovitz | 360/38 |
| 3,347,984 | 10/1967 | Holmberg | 178/6.6 DC |
| 3,428,762 | 2/1969 | Geddes et al. | 360/38 |
| 3,586,762 | 6/1971 | Hodge | 178/6.6 DC |
| 3,679,814 | 7/1972 | Barclay | 178/6.6 DC |
| 3,699,246 | 10/1972 | Hodge | 178/6.6 DC |

*Primary Examiner*—Vincent P. Canney
*Attorney, Agent, or Firm*—Lewis H. Eslinger; Alvin Sinderbrand

[57] ABSTRACT

A drop-out compensating circuit has an input circuit receiving an angularly modulated input signal, such as, a frequency modulated video signal reproduced from a magnetic tape or other recording media, and supplying such angularly modulated input signal to an output circuit by way of an interposed variable impedance circuit having its impedance controlled in accordance with the amplitude of the angularly modulated input signal, and a complementary signal source is connected to a junction between the variable impedance circuit and the output circuit for effectively replacing the angularly modulated input signal with a complementary signal in the output circuit when a drop-out occurs in the input signal. The complementary signal may be the output of a suitable oscillator, for example, having a frequency corresponding to that of a video signal representing gray in an image or picture reproduced by a cathode ray tube, or the complementary signal may be the delayed replica of an earlier video signal. The variable impedance circuit may be constituted by two diodes connected in parallel and having opposed polarities, or by two transistors of opposite conductivity types which receive the input signal at their base electrodes, and which have their emitter electrodes connected in common to the output circuit while their respective collector electrodes are connected to opposite terminals of a supply voltage source.

11 Claims, 5 Drawing Figures

DROP-OUT COMPENSATING CIRCUIT

BACKGROUND OF THE INVENTION

1. Field of the Invention

This invention relates generally to a drop-out compensating circuit, and more particularly is directed to an improved circuit capable of compensating for the occurrence of drop-out in a video signal which is magnetically recorded and reproduced.

2. Description of the Prior Art

The magnetic recording and reproducing of television or video signals has become quite widespread, and various types of magnetic recording and reproducing apparatus have been provided therefor. However, certain problems are still encountered with such apparatus, among which is the so-called drop-out phenomenon in the magnetically reproduced signal. The occurrence of drop-out in the magnetically reproduced signal may be caused by the uneven coating of magnetic material on the plastic film or the like which forms the substrate of the magnetic medium, the presence of dust on the surface of the magnetic medium, or creasing of the magnetic medium.

In magnetically recording and reproducing a video signal, the latter is usually employed to frequency modulate a carrier signal which is then recorded. In order to compensate for drop-out in the magnetically reproduced frequency-modulated video signal, it has been proposed to supply such reproduced signal, after suitable amplifying and limiting thereof, to an astable multi-vibrator which has its output connected through a limiter to a FM detector or demodulator for converting the output of the astable multi-vibrator to a video signal. So long as the reproduced frequency-modulated video signal has an amplitude above a predetermined level, the astable multi-vibrator is triggered to provide, at its output, a pulse signal which corresponds to the reproduced frequency-modulated video signal. However, when the amplitude of the signal received by the astable multi-vibrator falls below the predetermined level, that is, upon the occurrence of drop-out in the magnetically reproduced frequency-modulated video signal, the astable multi-vibrator auto-oscillates with a predetermined frequency which preferably corresponds to the frequency of the frequency-modulated video signal representing the gray level of a picture or image reproduced by a cathode ray tube, whereby to suppress deterioration of the reproduced image by reason of drop-out in the magnetically reproduced signal. However, the foregoing drop-out compensating circuit is disadvantageous in that, when the amplitude of the magnetically reproduced frequency-modulated video signal is at or near the threshhold or predetermined level below which the astable multivibrator commences its auto-oscillation, the operation of the astable multivibrator becomes unstable and beat interference may occur between the auto-oscillating signal and the frequency-modulated video signal.

It has also been proposed to provide a drop-out compensating circuit in which an envelope detector and level detector are employed to sense the occurrence of drop-out in the magnetically reproduced video signal and, in response thereto, to provide an alternate or complementary signal. However, the complexity of this last mentioned drop-out compensating circuit, as well as the changes that inherently occur in the detecting level and the time delay at the envelope detector, have prevented the practical use of such compensating circuit.

BRIEF SUMMARY OF THE INVENTION

Accordingly, it is an object if this invention to provide a drop-out compensating circuit which is free of the above described disadvantages of the circuits previously proposed to compensate for drop-out in a magnetically recorded and reproduced video signal.

More specifically, it is an object of this invention to provide a relatively simple drop-out compensating circuit which accurately and reliably responds to the occurrence of drop-out in the magnetically reproduced video signal so as to replace the dropped out portion of the video signal with a suitable alternate or complementary signal.

In accordance with an aspect of this invention, a drop-out compensating circuit has an input circuit receiving an angularly modulated input signal, such as, a frequency-modulated signal reproduced from a magnetic tape or other magnetic recording medium, and supplying such angularly modulated input signal to an output circuit by way of an interposed variable impedance circuit having its impedance controlled in accordance with the amplitude of the input signal, and a complementary signal source is connected to a junction between the variable impedance circuit and the output circuit for effectively replacing the angularly modulated signal, in the output circuit, with a suitable alternate or complementary signal when a drop-out occurs in such angularly modulated signal.

The above, and other objects, features and advantages of the invention, will be apparent from the following detailed description of illustrative embodiments thereof which is to be read in connection with the accompanying drawings.

DESCRIPTION OF THE PREFERRED EMBODIMENTS

Figures 1, 2, 5:
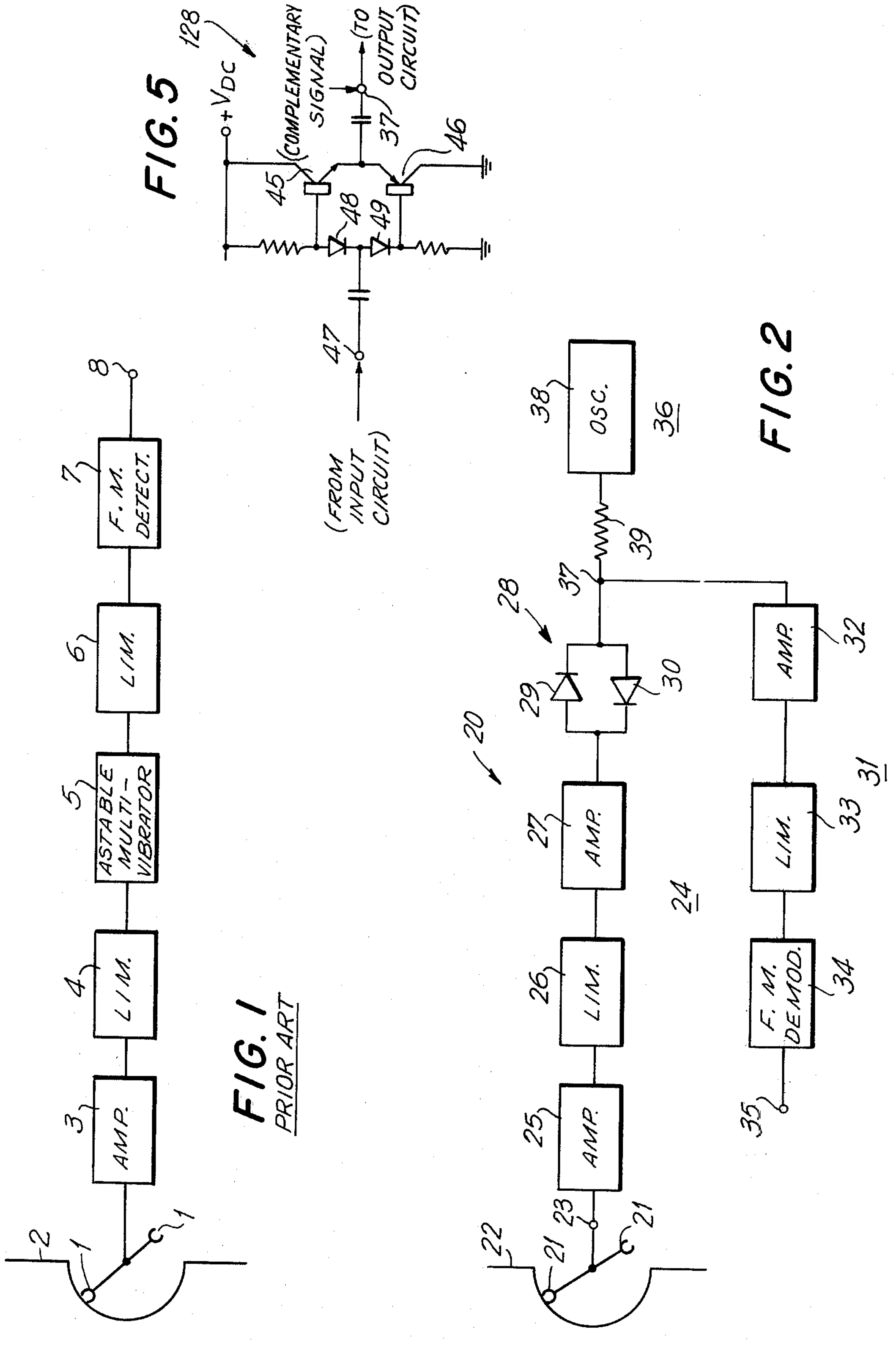
FIG. 1 PRIOR ART, FIG. 2, FIG. 5
FIG. 1 is a schematic block diagram of a drop-out compensating circuit according to the prior art.
FIG. 2 is a schematic block diagram showing a drop-out compensating circuit according to one embodiment of the present invention.
FIG. 5 is a circuit diagram showing another form of variable impedance circuit which may be employed in the drop-out compensating circuits according to the embodiments of this invention shown on FIGS. 2, 3 and 4.

Before proceeding with a description of embodiments of the present invention, specific reference will be made to FIG. 1 which illustrates a circuit according to the prior art serving to compensate for drop-out in a frequency-modulated video signal reproduced by means of a pair of rotary magnetic heads 1 which successively scan skewed or oblique record tracks on a magnetic tape 2. As shown, the signal from heads 1 is supplied to a reproducing amplifier 3 and from the latter through a limiter 4 to an astable multi-vibrator 5. So long as the reproduced frequency-modulated video signal has an amplitude above a predetermined level, the signal applied from limiter 4 to astable multi-vibrator 5 is sufficient to trigger the latter so that the astable multivibrator 5 produces an output pulse signal corresponding to the reproduced frequency-modulated video signal, and which is passed through a limiter 6 to a FM detector or demodulator for conversion to a video output signal supplied to an output terminal 8. When a drop-out occurs in the frequency-modulated video signal reproduced by heads 1, the signal applied through limiter 4 to astable multi-vibrator 5 is at an insufficient level to trigger the latter with the result that auto-oscillation of the astable multi-vibrator 5 occurs at a predetermined frequency which preferably corresponds to that of a frequency-modulated video signal representing a gray level in a video picture or image reproduced by a cathode ray tube. Such auto-oscillation output of astable multi-vibrator 5 is passed through limiter 6 to FM detector 7 so as to occupy the gap or interval in the video output signal at terminal 8 that would otherwise have occurred by reason of the drop-out, whereby to prevent deterioration of the reproduced image or picture by reason of such drop-out. However, as previously mentioned, when the amplitude of the reproduced frequency-modulated video signal is at or near the threshhold or predetermined level below which astable multi-vibrator 5 commences auto-oscillation, the operation of multi-vibrator 5 becomes unstable and a beat interference may occur between the auto-oscillating signal and the frequency-modulated video signal.

Referring now to FIG. 2, it will be seen that, in the drop-out compensating circuit 20 according to the embodiment of the present invention there illustrated, the frequency-modulated video signal reproduced by rotary magnetic heads 21 from scanned oblique record tracks on a magnetic tape 22 is applied to an input terminal 23 of an input circuit 24 for passage, in succession, through a reproducing amplifier 25 and a limiter 26 and then through an amplifier 27 which functions as an impedance converter and has a low output impedance. The output signal from amplifier 27 is supplied to a variable impedance circuit 28 which, in the embodiment illustrated on FIG. 2, is composed of a pair of diodes 29 and 30 connected in parallel with each other and having opposed polarities.

The variable impedance circuit 28 is shown to be interposed between input circuit 24 and an output circuit 31 which includes, in succession, an amplifier 32, a limiter 33 and a FM demodulator 34 which supplies a video signal to an output terminal 35. Further, an alternate signal source 36 is provided for supplying a so-called complementary signal to a junction 37 between variable impedance circuit 28 and output circuit 31. Such alternate signal source 36 may include, as shown on FIG. 2, an oscillator 38 that continuously provides the complementary signal at a frequency corresponding to that of the frequency-modulated video signal representing the gray level of a video picture or image when reproduced on a cathode ray tube, and a relatively large resistor or impedance 39 through which the complementary signal is applied to junction 37.

The variable impedance circuit 28 has its impedance value controlled in response to the amplitude of the output signal from amplifier 27 which, in turn, varies with the amplitude or level of the reproduced frequency-modulated video signal, or other angularly modulated signal, applied to the input terminal 23 of input circuit 24. More specifically, variable impedance circuit 28 has a low impedance value so long as the amplitude or level of the signal applied to input terminal 23 is above a predetermined level, whereas, when the amplitude of the input signal falls below that predetermined level, as upon the occurrence of a drop-out in the reproduced frequency-modulated video signal, circuit 28 provides a relatively large impedance. The output impedance of alternate signal source 36, as determined by impedance or resistor 39, and as observed from the junction 37, is preferably higher than the impedance of the variable impedance circuit 28, also as observed from junction 37, when variable impedance circuit 28 provides a low impedance in response to the reception of a reproduced frequency-modulated video signal having its amplitude above the predetermined level. Further, amplifier 32 of output circuit 31 preferably has a relatively high input impedance.

The drop-out compensating circuit 20 according to this invention operates as follows:

If it is assumed that both diodes 29 and 30 of variable impedance circuit 28 are formed of silicon, then both diodes will conduct so long as the output signal from amplifier 27 has an amplitude in excess of 0.7 volts. When diodes 29 and 30 are conductive, the compensating or alternate signal applied from source 36 to junction 37 is bypassed through variable impedance circuit 28 and an output circuit of amplifier 27, with the result that the reproduced video signal appears at output terminal 35 of circuit 20. However, when there is a drop-out in the frequency-modulated video signal reproduced by heads 21, the output signal from amplifier 27 has an amplitude well below the threshhold level of diodes 29 and 30 with the result that the impedance of circuit 28 becomes high in response to such drop-out. Therefore, the compensating or alternate signal from source 36 is introduced into output circuit 31 at junction 37 and a corresponding signal appears at output terminal 35 which represents the gray level of a video picture or image reproduced by a cathode ray tube. It will be apparent that the level of the reproduced frequency-modulatd video signal at which switching of diodes 29 and 30 occurs may be adjustable by suitably controlling the gain of the amplifiers 25 and 27 or the limiting level of the limiter 26. Although the threshhold or switching level for the diodes 29 and 30 has been given above for the case where such diodes are formed of silicon, it is preferable to employ germanium diodes in variable impedance circuit 28 because of the relatively lower forward bias voltage of such germanium diodes.

In the drop-out compensating circuit 20 of FIG. 2, the alternate or complementary signal introduced into output circuit 31 to occupy the gap in the output video signal that would be caused by a drop-out in the reproduced frequency-modulated video signal is derived from an oscillator 38 having a suitably selected frequency. However, in accordance with this invention, the alternate or complementary signal which is introduced into the output circuit in response to a drop-out in the reproduced frequency-modulated video signal may be a delayed replica of an earlier interval of the latter. For example, as shown on FIG. 3 in which the various components of a drop-out compensating circuit 20*a* according to another embodiment of this invention are identified by the same reference numerals as the corresponding components in FIG. 2, but with the letter *a* appended thereto, the complementary signal source 36*a* includes an amplifier 40 which receives a portion of the output of limiter 26*a* in input circuit 24*a*, a delay device or circuit 41 which receives the limited and amplified frequency-modulated video signal from amplifier 40 and suitably delays such signal, for example, by one horizontal period or interval of the video signal, and an amplifier 42 which preferably has a high output impedance and through which the delayed frequency-modulated video signal is supplied to the junction 37*a*. The drop-out compensating circuit 20*a* of FIG. 3 operates in substantially the same manner as has been described above with reference to FIG. 2 except that, upon the occurrence of a drop-out in the reproduced frequency-modulated video signal, the delayed replica of an earlier reproduced frequency-modulated video signal is applied at junction 37*a* to output circuit 31*a* for filling the gap that would otherwise appear in the video signal derived from output terminal 35*a*.

Figure 3:
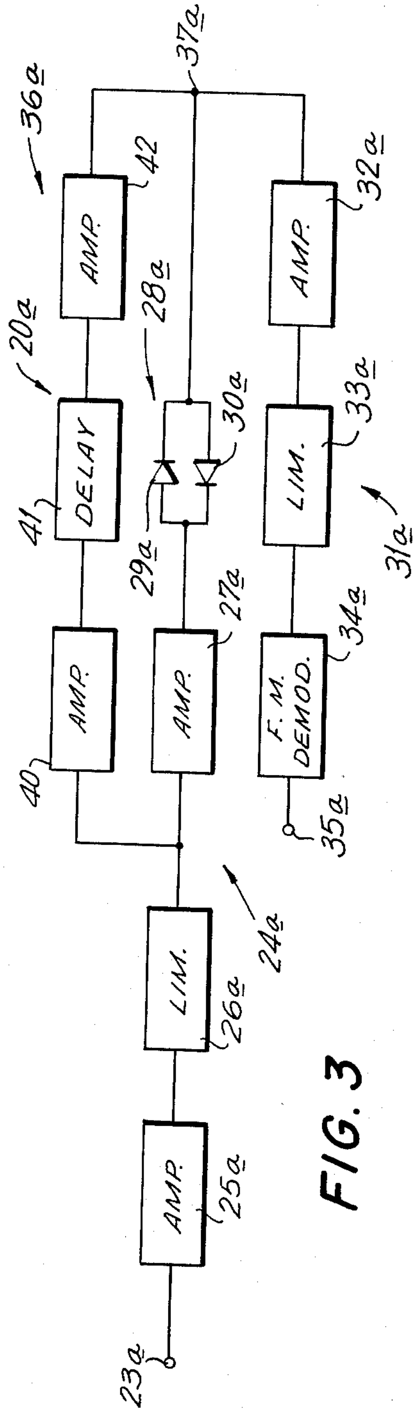
FIG. 3 is a view similar to that of FIG. 2, but showing another embodiment of this invention.

In the embodiment shown on FIG. 3, the complementary signal source 36*a* for providing a delayed replica of the reproduced frequency-modulated video signal has its input receiving such signal in advance of the variable impedance circuit 28*a*. However, as shown on FIG. 4, the complementary signal source or delay circuit may produce a delayed replica of the reproduced frequency-modulated video signal after passage of the latter through the variable impedance circuit. More particularly, in the drop-out compensating circuit 20*b* shown on FIG. 4, and in which the various components are identified by the same reference numerals as are used to identify the corresponding components on FIG. 2, but with the letter *b* appended thereto, the input circuit 24*b* includes a transistor amplifier 25*b* receiving the reproduced frequency-modulated video signal from input terminal 23*b*, and a limiter 26*b* through which the output of transistor amplifier 25*b* is passed to an emitter follower amplifier 27*b* having a relatively low output impedance. The variable impedance circuit 28*b* is shown to be interposed between input circuit 24*b* and an output circuit 31*b* which includes, in sequence, a transistor amplifier 32*b*, a limiter 33*b*, and another emitter follower amplifier 43 having its output connected to the FM demodulator 34*b* which is, in turn, connected to output terminal 35*b* for providing the output video signal at the latter.

In the drop-out compensating circuit 20*b*, the compensating signal source 36*b* is shown to include a suitable delay device or circuit 41*b* which also receives the output signal from emitter follower amplifier 43 and delays the same for a suitable period, for example, one horizontal period or interval of the video signal, a transistor 42*b* which amplifiers the delayed signal from delay device 41*b*, and a limiter 44 through which the amplified and delayed signal is applied to the junction 37*b* between variable impedance circuit 28*b* and the input circuit of transistor amplifier 32*b*. The limiting level of the limiter 26*b* in input circuit 24*b* is preferably higher than that of the limiter 44 in complementary signal source 36*b* so that, when diodes 29*b* and 30*b* in variable impedance circuit 28*b* are conductive, as previously described, the signal passing through variable impedance circuit 28*b* to output circuit 31*b* can suppress the signal applied to junction 37*b* from limiter 44 by reason of the characteristics of the frequency-modulated video signal.

Figure 4:
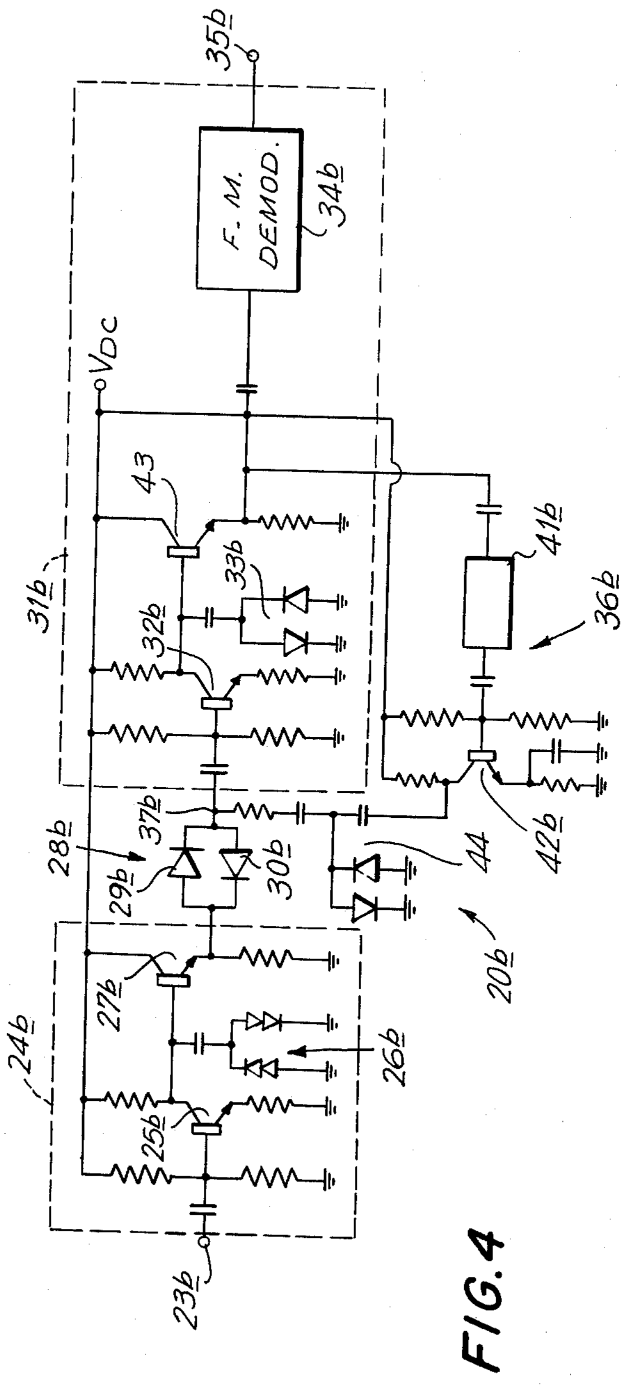
FIG. 4 is a circuit diagram of a drop-out compensating circuit according to still another embodiment of the invention.

Although the variable impedance circuits 28, 28*a* and 28*b* shown on FIGS. 2, 3 and 4 are each constituted by a pair of diodes connected in parallel and having opposed polarities, it will be noted that other forms of variable impedance circuits may be employed in drop-out compensating circuits according to this invention. For example, as shown on FIG. 5, a variable impedance circuit 128 which may be used in place of the previously described variable impedance circuit 28, 28*a* or 28*b* may be comprised of two transistors 45 and 46 of opposite conductivity types which are connected in series across a voltage supply source, the opposite terminals of which are indicated at $+V_{DC}$ and ground, with a junction between the series-connected transistors being connected to the junction 37 with the output circuit. More specifically, as shown, the emitter electrodes of transistors 45 and 46 are connected, in common, to junction 37, while the collector electrodes of transistors 45 and 46 are respectively connected to the voltage supply line $+V_{DC}$ and to ground. The reproduced frequency-modulated video signal from the input circuit 24, 24*a* or 24*b* of the previously described circuits is applied to an input terminal 47, and is supplied from the latter through diodes 48 and 49 to the base electrodes of transistors 45 and 46, respectively.

The variable impedance circuit 128 of FIG. 5 operates substantially in the same manner as the previously described variable impedance circuit 28 in that, when the amplitude of the reproduced frequency-modulated video signal received at terminal 47 exceeds a predetermined level, the circuit 128 has a low impedance and such reproduced frequency-modulated video signal is passed to the associated output circuit by way of junction 37, while the alternate or complementary signal also applied to junction 37 is bypassed through circuit 128. On the other hand, when the amplitude of the signal applied to terminal 47 falls below a predetermined level, circuit 128 provides a large impedance so that the complementary or alternate signal applied to junction 37 is supplied therefrom to the associated output circuit. The variable impedance circuit 128 of FIG. 5 is advantageous in that, when there is no drop-out in the reproduced frequency-modulated video signal, the impedance of circuit 128 is lower than that obtainable with the circuit 28 made up of two diodes.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A drop-out compensating circuit, comprising:

an input circuit for receiving an angularly modulated signal, the input circuit having a relatively low output impedance;

an output circuit for providing an output signal;

a source for supplying a complementary signal, the source having a relatively high output impedance; and variable impedance means having an input terminal connected to said input circuit and an output terminal connected in common to said output circuit and to the output of said source, said variable impedance means exhibiting an impedance determined by the level of said angularly modulated signal applied thereto by said input circuit such that said impedance is less than said source output impedance when said angularly modulated signal level is greater than a predetermined level so as to bypass said complementary signal applied to said output terminal by said sourcee, and said impedance is relatively high when a drop-out causes said angularly modulated signal level to be less than said predetermined level to thereby enable said complementary signal applied to said output terminal to be coupled to said output circuit.

2. A drop-out compensating circuit according to claim 1; in which said variable impedance means includes two diodes connected in parallel between said input and said output terminals and having opposed polarities.

3. A drop-out compensating circuit according to claim 1; in which said variable impedance means includes two transistors of opposite conductivity types having base electrodes connected to said input terminal, emitter electrodes connected in common to said output terminal and collector electrodes connected to opposite terminals of a voltage supply source.

4. A drop-out compensating circuit according to claim 1; in which said input circuit includes emitter follower amplifier means providing said relatively low output impedance and being connected to said variable impedance means.

5. A drop-out compensating circuit according to claim 1; in which the amplitude of said complementary signal from said complementary signal source is smaller than the amplitude of said angularly modulated signal as supplied to said variable impedance means from said input circuit in the absence of said drop-out in the angularly modulated signal.

6. A drop-out compensating circuit according to claim 1; in which said input circuit and said complementary signal source include respective limiting means, with the limiting level of said limiting means in said input circuit being greater than the limiting level of said limiting means in said complementary signal source.

7. A drop-out compensating circuit according to claim 1; in which said complementary signal source includes alternating signal generating means.

8. A drop-out compensating circuit according to claim 7; in which said alternating signal generating means is an oscillator, and said complementary signal source further includes a high impedance element between said oscillator and said output terminal.

9. A drop-out compensating circuit according to claim 1; in which said complementary signal source includes delay circuit means for supplying a delayed replica of said angularly modulated signal to said output terminal.

10. A drop-out compensating circuit according to claim 9; in which said delay circuit means has an input receiving said angularly modulated signal in advance of said variable impedance means.

11. A drop-out compensating circuit according to claim 9; in which said delay circuit means has an input receiving said angularly modulated signal after passage of the latter through said variable impedance means.

* * * * *